United States Patent Office 2,733,158
Patented Jan. 31, 1956

2,733,158
GLASS COMPOSITION

Ralph L. Tiede, Newark, Ohio, assignor to Owens-Corning Fiberglas Corporation, a corporation of Delaware No Drawing. Application November 7, 1952,
Serial No. 319,431

4 Claims. (Cl. 106—50)

This invention relates to a glass composition having improved physical properties and more specifically to such a composition which is especially suited for the manufacture of fibers.

In the past, fibrous glass has been used in a multiplicity of products and has been used in combination with other materials in many additional products. The fibers have been treated with various sizes, finishes and other like treatments to enhance theeir physical properties both when used as a finished product or as one component of a finished product such as a reinforcing material or a coating material.

These treatments have been used to improve tensile strength, lubricity, hand, abrasion resistance and the like. The treatments devised and used in the past have not provided the necessary abrasion resistance in the fibrous glass for many uses including the use as a reinforcing material in rubbery compositions.

It has been found that when glass twines, cords, strands or fabrics are used to reinforce flexible products such as those of plasticized resinous materials or rubbery materials, the individual fibers of glass in the reinforcing material abrade upon one another causing failure within the reinforcing fibers and subsequent failures in the finished products. Likewise certain articles of fibrous glass which are subjected to repeated flexing and bending such as curtain materials and the like may show wear or fail completely.

It is an object of this invention to provide glass compositions having high abrasion resistance and flex resistance.

It is also an object to provide such glass compositions which are readily formed into fibers.

It is a further object to produce a siliceous composition having a low liquidus temperature, a low devitrification rate, the proper viscosity at low temperature, a wide operating range and the other requisite properties whereby the production of fibrous material is facilitated.

Other objects are apparent from the following description of the invention which is illustrative but is not intended to limit the claims.

The objects are attained by the addition of a metallic oxide to siliceous compositions. It has been discovered that glass compositions containing copper oxide have very high abrasion resistance and flex resistance in addition to the other requisite properties desirable when forming fibrous materials. Glass compositions illustrative of this invention are as follows, portions being expressed in weight percent:

Example 1

| | Percent |
|---|---|
| $SiO_2$ | 50.0–60.0 |
| $Al_2O_3$ | 4.0–17.0 |
| $B_2O_3$ | 2.0–13.0 |
| CaO | 3.0–15.0 |
| $Na_2O$ | 0.2– 3.5 |
| CuO | 5.0–15.0 |

A preferred embodiment of the invention is a composition of matter comprising basically the following ingredients in substantially the amounts indicated in weight percent:

Example 2

| | Percent |
|---|---|
| $SiO_2$ | 53.0–59.0 |
| $Al_2O_3$ | 5.0–16.0 |
| CaO | 5.0–12.0 |
| $B_2O_3$ | 3.5–10.5 |
| $Na_2O$ | 0.2– 3.0 |
| CuO | 8.0–12.0 |

A glass composition having the following ingredients in the weight percentages indicated is prepared in the conventional manner with the batch being melted under oxidizing conditions.

Example 3

| | Percent |
|---|---|
| $SiO_2$ | 56.9 |
| $Al_2O_3$ | 5.4 |
| MgO | 2.5 |
| CaO | 6.1 |
| $B_2O_3$ | 6.4 |
| $Na_2O$ | 0.5 |
| $K_2O$ | 0.3 |
| SrO | 11.2 |
| CuO | 9.0 |
| $Li_2O$ | 1.7 |

This glass which has 9.0% copper oxide has marked abrasion resistance and flex resistance. Furthermore, this glass is readily adaptable to be formed into individual fibers which can then be further processed into strands, cords or fabrics as may be desired.

Another example of a copper bearing glass is prepared by using the following recipe:

Example 4

| | Percent |
|---|---|
| $SiO_2$ | 55.7 |
| $Al_2O_3$ | 5.6 |
| MgO | 2.6 |
| CaO | 6.0 |
| $B_2O_3$ | 4.4 |
| $Na_2O$ | 2.5 |
| $K_2O$ | 0.2 |
| SrO | 11.4 |
| CuO | 9.7 |
| $Li_2O$ | 1.9 |

Another copper oxide glass composition is as follows:

Example 5

| | Percent |
|---|---|
| $SiO_2$ | 55.7 |
| $Al_2O_3$ | 14.5 |
| CaO | 10.0 |
| $B_2O_3$ | 9.0 |
| $Na_2O$ | 0.6 |
| CuO | 10.2 |

The above copper oxide containing glass compositions have been found very suitable for making reinforcing materials for rubbery compositions and flexible resinous compositions. These glasses provide very high abrasion resistance and flex resistance, which gives long life to the reinforcing material and also to the reinforced product.

The glass compositions of this invention have much greater abrasion resistance and flex resistance than do those compositions having no copper oxide as an ingredient. An example of a conventional glass composition used for producing fibers and having no copper oxide present is as follows:

Example 6

| | Percent |
|---|---|
| SiO$_2$ | 54.0 |
| Al$_2$O$_3$ | 14.0 |
| CaO | 17.5 |
| MgO | 4.5 |
| B$_2$O$_3$ | 10.0 |

This glass has good fiber forming characteristics and is fully disclosed in U. S. Patent 2,334,961.

Similar fibers produced from the compositions of both Examples 4 and 6 are tested as follows. A bundle comprising thirty-six individual fibers is twisted to produce ten turns per inch in the bundle. The bundle is suspended at one end and loaded with 31.5 grams which is attached to the opposite end of the bundle. The bundle is then repeatedly bent partially around a 1/16-inch stainless steel rod at a rate of about eighty-five times per minute. The bundle is flexed to produce about a 90° angle in the bundle, this being done in such a manner that the bundle is not dragged across the stainless steel rod but instead is only in contact therewith.

In carrying out this test, the individual fibers within the bundle are forced to abrade one upon another at the same time that they are being flexed. The abrasion resistance of the copper bearing glass compositions is much greater than that of the non-copper glasses. Fibers produced from the compositions of Example 6 fail in 3 minutes while those of Example 4 fail only after 488 minutes. This increase of over 150 times in flex and abrasion resistance makes it possible to use the copper containing glasses in many product applications not formerly possible. These improved glass fibers can be used for making cords, strands, twine and other textile materials, including knitted or woven fabrics such as those used in reinforcing materials for belts, tires, sheeting and in curtains, drapes and the like.

To demonstrate further the non-abrasive nature of the glass compositions of this invention, marbles are made of both Example 3 and Example 6. Two marbles of the copper containing glass are rubbed together and no screech can be heard. When two non-copper glass marbles are rubbed together a screech quite disturbing to the ear is produced. The slippery, non-abrasive surface afforded by the copper ingredient in the batch provides good abrasion resistance as evidenced by the lack of any screech when the two masses of glass are rubbed together.

The copper may be added to the batch in the form of cupric or cuprous oxide or as a salt of copper as may be desired in order to achieve the range of proportions of copper oxide in the final composition as defined in the examples. The batch is preferably melted under oxidizing conditions so that the copper is in the divalent form in the final glass product.

While a glass made in accordance with the present invention may be formed if desired into the usual pressed blown, cast, rolled or extruded objects, commonly found in the art, it finds its chief application in the manufacture of filaments by means of a spool running at high speeds as disclosed in U. S. Patent 2,234,986 to Slayter or by means of roll pullers which attenuate the fibers which are subsequently gathered into strands. Fibers and strands so produced may also be further fabricated into twisted yarns, ply yarns and interwoven, knitted or braided textile materials, including fabrics.

The fibers used in making these products have very fine diameters from about $50 \times 10^{-5}$ to about $1 \times 10^{-5}$ inches or less. Various modifications and finishes may be made in the present invention within the spirit and scope of the following claims:

I claim:

1. Glass having substantially the following composition by weight:

| | Percent |
|---|---|
| SiO$_2$ | 55.7 |
| Al$_2$O$_3$ | 5.6 |
| MgO | 2.6 |
| CaO | 6.0 |
| B$_2$O$_3$ | 4.4 |
| Na$_2$O | 2.5 |
| K$_2$O | 0.2 |
| SrO | 11.4 |
| CuO | 9.7 |
| Li$_2$O | 1.9 |

2. As an article of manufacture, fibrous glass containing:

| | Percent |
|---|---|
| SiO$_2$ | 55.7 |
| Al$_2$O$_3$ | 5.6 |
| MgO | 2.6 |
| CaO | 6.0 |
| B$_2$O$_3$ | 4.4 |
| Na$_2$O | 2.5 |
| K$_2$O | 0.2 |
| SrO | 11.4 |
| CuO | 9.7 |
| Li$_2$O | 1.9 |

3. Glass consisting essentially of the following ingredients expressed in weight per cent:

| | Percent |
|---|---|
| SiO$_2$ | 55.7 |
| Al$_2$O$_3$ | 5.6 |
| MgO | 2.6 |
| CaO | 6.0 |
| B$_2$O$_3$ | 4.4 |
| Na$_2$O | 2.5 |
| K$_2$O | 0.2 |
| SrO | 11.4 |
| Li$_2$O | 1.9 | and containing more than 9% by weight copper oxide.

4. Fibrous glass consisting essentially of the following ingredients expressed in weight per cent:

| | Percent |
|---|---|
| SiO$_2$ | 55.7 |
| Al$_2$O$_3$ | 5.6 |
| MgO | 2.6 |
| CaO | 6.0 |
| B$_2$O$_3$ | 4.4 |
| Na$_2$O | 2.5 |
| K$_2$O | 0.2 |
| SrO | 11.4 |
| Li$_2$O | 1.9 | and containing more than 9% copper oxide to provide abrasion and flex resistance.

References Cited in the file of this patent

UNITED STATES PATENTS

| Number | Name | Date |
|---|---|---|
| 1,939,329 | White | Dec. 12, 1933 |
| 2,339,928 | Hood | Jan. 25, 1944 |
| 2,394,493 | Schoenlaub | Feb. 5, 1946 |
| 2,685,526 | Labino | Aug. 3, 1954 |